United States Patent [19]

Robinson et al.

[11] Patent Number: 5,490,884
[45] Date of Patent: Feb. 13, 1996

[54] METHOD AND SYSTEM FOR EXTRACTING A SOLUTE FROM A FLUID USING DENSE GAS AND A POROUS MEMBRANE

[75] Inventors: James R. Robinson, 3326 Dyer Rd., Livermore, Calif. 94550; Marc J. Sims, 80 The Plaza Dr., Berkeley, Calif. 94705

[73] Assignees: Tastemaker; Separation Equipment Technologies, Inc.; Mark Sims, S.F.E.; James R. Robinson; Marc J. Sims

[21] Appl. No.: 303,445

[22] Filed: Sep. 9, 1994

[51] Int. Cl.⁶ .................... B01D 53/22; B01D 63/02
[52] U.S. Cl. ................ 95/45; 95/50; 96/8; 96/10; 426/422; 426/427
[58] Field of Search .............. 95/45–55; 96/4, 96/7–10, 14; 426/422, 427, 487

[56] References Cited

U.S. PATENT DOCUMENTS

| | | | |
|---|---|---|---|
| 3,477,856 | 11/1969 | Schultz . | |
| 4,113,886 | 9/1978 | Katz | 426/427 X |
| 4,341,804 | 7/1982 | Prasad et al. | 426/422 X |
| 4,436,755 | 3/1984 | Perdomini et al. | 426/422 X |
| 4,583,996 | 4/1986 | Sakata et al. | 95/51 X |
| 4,793,841 | 12/1988 | Burr | 95/51 X |
| 4,820,537 | 4/1989 | Katz | 426/422 X |
| 4,873,835 | 10/1989 | Rojey et al. | 95/50 X |
| 4,929,357 | 5/1990 | Schucker | 95/50 X |
| 5,015,585 | 5/1991 | Robinson | 423/240.242 |
| 5,169,529 | 12/1992 | Carroll et al. | 210/321.78 |
| 5,204,003 | 4/1993 | Cochran, Jr. | 95/48 X |
| 5,236,474 | 8/1993 | Schofield et al. | 95/47 |
| 5,263,409 | 11/1993 | von Eikeren et al. | 426/422 X |
| 5,281,254 | 1/1994 | Birbara et al. | 95/51 X |
| 5,338,575 | 8/1994 | Ben-Nasr et al. | 426/427 |
| 5,395,636 | 3/1995 | Degen et al. | 426/422 |

FOREIGN PATENT DOCUMENTS

| | | | |
|---|---|---|---|
| 3443390 | 5/1986 | Germany | 426/427 |
| 3-030663 | 2/1991 | Japan | 426/422 |
| WO89/10703 | 11/1989 | WIPO | 426/422 |
| WO94/01204 | 1/1994 | WIPO | 95/52 |

OTHER PUBLICATIONS

Seibert, A. F. et al., "Hydraulics and Mass Transfer Efficiency of A Commercial–Scale Membrane Extractor", Separation Science and Technology, 281 (1–3), pp. 343–359 (1993), ©1992 by Marcel Dekker, Inc.

Yang, Min J. et al., "Extraction of Semivolatile Organic Compounds from Aqueous Samples Using High–Density Carbon Dioxide and Hollow Fiber Membrane Module", Analytical Chemistry, vol. 65, No. 18, Sep. 15, 1993, pp. 2538–2541.

*Primary Examiner*—Robert Spitzer
*Attorney, Agent, or Firm*—Wood, Herron & Evans

[57] ABSTRACT

This invention is directed to a method and system for extracting a solute from a fluid or a dense gas using a porous membrane. The invention includes providing a porous membrane having opposite sides in a module under pressure, with the membrane serving as a barrier interface between a fluid and a dense gas. The dense gas is introduced into the module on one side of the membrane and the fluid is introduced on the opposite side of the membrane. At least one of the fluid and dense gas contains a solute to be extracted, and the other one of the fluid and dense gas serves as an extracting medium. The dense gas has a density of at least about 0.5 g/cc and is essentially immiscible in the fluid so as to provide two phases. The process is conducted with the pressure on both sides of the membrane in the module being essentially the same, and the solute is extracted across the membrane as driven by the concentration gradient of the solute across the membrane. Preferably, the porous membrane is a bundle of hollow fiber membranes.

33 Claims, 3 Drawing Sheets

METHOD AND SYSTEM FOR EXTRACTING A SOLUTE FROM A FLUID USING DENSE GAS AND A POROUS MEMBRANE

FIELD OF THE INVENTION

This invention relates to fluid extraction and, more particularly, to extraction of solutes employing a hollow fiber membrane module where at least one of the fluids is a dense gas.

BACKGROUND OF THE INVENTION

One method of solute extraction is the traditional, equilibrium-based liquid-liquid extraction process using a contacting device such as packing in an extraction column. One example of this method of extraction is described in Schultz U.S. Pat. No. 3,477,856. The '856 patent teaches a process for isolating flavors from flavor-containing materials, which involves extracting the flavor with liquid carbon dioxide using an extraction column. In this typical system, an aqueous solution is introduced into the top of the column, At the same time, liquid $CO_2$ enters from a lower point in the column. Because of differing densities, the aqueous solution moves downward while the liquid $CO_2$ moves up in the column, with the liquid $CO_2$ forming a solution with the organic solute. This liquid $CO_2$-flavor phase then moves out of the top of the extraction vessel, where the organic solute is separated by evaporation of the carbon dioxide.

One of the limitations of traditional equilibrium-based extraction is that, because the system is dispersion based and gravity dependent, solvents of different densities must be used. Another limitation of traditional liquid-liquid extraction is the potential for the formation of stable emulsions, in which case the extraction will not occur, Furthermore, the contacting surface area within the extractor may be reduced by channeling. As the two phases are dispersed in one another, they will tend to create and follow paths of least resistance within the column. If the packings are not tight, the dispersion of the two phases, and therefore mass transfer efficiency, may be compromised.

Another more recent development in liquid-liquid extraction has been the use of microporous hollow fiber membranes. In a membrane extractor, many fibers are packed together to form a fiber bundle which is housed within an outer shell, Typically, one liquid is passed through the lumen of the fibers and the other liquid is passed along the shell side of the fibers, with solute transfer occurring across the porous fiber membranes. Because membrane extraction is a dispersion-free operation, the system does not require a density difference between the phases. Furthermore, the potential for emulsion formation is reduced because the membrane stabilizes the interface between the two phases. Seibert, A. F., et al., "Hydraulics and Mass Transfer Efficiency of a Commercial-Scale Membrane Extractor", *Separation Science and Technology*, 28 (1–3), pp. 343–359 (1993).

However, extractions performed using hollow fiber membrane modules have met with limited success. The mass transfer efficiency of these modules has been less than expected, due largely to significant shell-side fiber bypassing. Id. Shell-side fiber bypassing is a phenomenon in which a significant portion of the fibers within the module are bypassed by the shell-side fluid. Consequently, only a fraction of the total fiber surface area is utilized, making the module relatively inefficient. This phenomenon can render as much as 70%–90% of the membrane surface area ineffective. Id.

Some modules have attempted to reduce this bypassing problem by creating a baffle within the module that forces the shell-side fluid to contact more of the membrane surface area. However, this technique does not solve shell-side fiber bypassing and also adds to the production cost of the module. Therefore, it is desirable to have a method and system for extracting a solute from a fluid using porous hollow fiber membranes, in which shell-side fiber bypassing is reduced and mass transfer efficiency is improved.

In view of the above brief background and the general state of the art, improvements are needed in methods and apparatus for extracting solutes.

SUMMARY OF THE INVENTION

This invention is directed to a method of extracting a solute from a fluid or a dense gas, as well as to a system for carrying out the inventive method. The method uses a porous membrane having opposite sides in a module under pressure, with the membrane being nonselective for the solute and serving as a barrier interface between a fluid and a dense gas. The dense gas is introduced into the module on one side of the membrane with the fluid on the opposite side of the membrane. At least one of the fluid and dense gas contains a solute to be extracted, and the other serves as an extracting medium. The dense gas has a density of at least about 0.5 g/cc, and is essentially immiscible in the fluid so as to provide two phases. The process is conducted with the pressure on both sides of the membrane in the module being essentially the same, and the solute is extracted across the membrane as driven by the concentration gradient of the solute between the fluid and the dense gas. If desired, the method also may include the step of drying the membrane with the dense gas prior to the step of providing the fluid on the opposite side of the membrane.

Preferably, the dense gas and fluid are passed on opposite sides of the membrane, and more preferably, the dense gas and fluid are passed countercurrently on the opposite sides of the membrane. While a static system reaches equilibrium quickly, passing the fluid and dense gas maintains a concentration gradient over time, and a countercurrent flow enhances the gradient.

The dense gas may be selected from a number of different gases, with carbon dioxide being preferred. In addition to being inexpensive and readily available, carbon dioxide is nontoxic, nonflammable, relatively inert, and leaves no residue in the extracted product. Examples of other dense gases include methane, ethane, propane, butane, isobutane, ethene, propene, tetrafluoromethane, chlorodifluoromethane, dinitrogen monoxide, sulphur hexaflouride, ammonia, methyl chloride and hydrofluorocarbons. The hydrofluorocarbons include partially fluorinated methanes, ethanes and propanes, such as fluromethane, trifluoromethane, tetrafluoroethane (known commonly as HFC-134a), 1, 1, 1, 2, 3, 3, 3-heptafluoropropane (known commonly as P227), HFC-143a and HFC-125, and mixtures thereof.

The fluid may be any of a number of different fluids, for example, fruit juice, fruit puree, vegetable juice, vegetable puree, oil-in-water emulsions, live cell fermentor broth and enzyme broth. If desired, the fluid may be a second dense gas having a density of at least about 0.5 g/cc. The solute to be extracted may be any solute with some solubility in both the fluid and dense gas, and typically is a flavor, fragrance, pharmaceutical or chelated metal.

The method typically is conducted within a temperature range of from about −10° C. to about 200° C., and a pressure range of from about 2 bar to about 700 bar. This temperature range encompasses substantially all aqueous biological systems, and the pressure range encompasses operating pressures for both analytical and commercial-scale systems.

A system for extracting a solute from a fluid or a dense gas according to the principles of this invention includes a dense gas supply source, a fluid supply source and a pressurizable module as described in the method above, with the module operatively connected to the dense gas and fluid supply sources. The system may further include means for passing the dense gas and fluid on opposite sides of the membrane, as well as means for substantially equalizing the pressure of the dense gas and fluid before the dense gas and fluid enter the module. If desired, the pressure equalizing means may include means for substantially preventing extraction of solute within the pressure equalizing means prior to extraction within the pressurizable module. Additionally, the system may include means for monitoring the dense gas, fluid and amount of solute transfer, as well as means for returning the gas and fluid to the dense gas and fluid supply sources after extraction of the solute.

With respect to the porous membrane, preferably the membrane is a hollow fiber membrane or bundle of hollow fiber membranes. Use of hollow fiber membranes allows for a high contacting surface area within a given module. If desired, other types of membranes may be used, such as, for example, a flat membrane configured in a spiral-wound membrane module or a plate frame. The membrane itself may be made of any of a number of different materials including, for example, polypropylene, polyethylene, polytetrafluoroethylene, polyvinylidene difluoride, nylon, polysulfonate, polycarbonate, polyester, cellulose acetate, cellulose nitrate, cellulose and acrylic.

The pores preferably are essentially symmetrical so that the membrane will be minimally affected by any pin-hole defects in the membrane surface. The diameter of the pores preferably is on the order of about 0.001 micron to about 1 micron, and more preferably, about 0.1 micron to about 0.2 micron. The 0.1 micron to 0.2 micron range typically provides the best balance of flow characteristics combined with symmetrical pore structure. The thickness of the membrane preferably is on the order of about 0.005 mm to about 3 mm, and more preferably, about 0.2 mm to about 0.6 mm. These ranges provide an increasingly better balance of membrane strength and integrity combined with desired flow characteristics.

One of the advantages of the inventive method and system is improved mass transfer efficiency through reduced shell-side fiber bypassing. In contrast to traditional liquids, dense gases have generally lower viscosities and higher diffusion coefficients. These properties allow a dense gas to distribute to and penetrate much more of the fiber surface within the module, thereby improving transfer efficiency.

A further advantage is the unexpected ability of the dense gas to dry the porous membrane prior to introduction of the fluid, thereby minimizing the potential for membrane wetting once the fluid is introduced and improving mass transfer efficiency.

Another advantage is the ability to pass a dense gas through the module at a faster rate than traditional liquid solvents. Flow rate is an important factor in transfer efficiency, but flow rate with traditional liquid is limited because of adverse frictional forces and increased shell-side fiber bypassing. Because dense gas generates less friction within the module, it may be passed at a higher rate, improving transfer efficiency.

A further advantage is the ability of the dense gas to occupy the pores of the membrane during extraction, thereby reducing the thickness of the boundary layer where extraction is occurring and improving mass transfer efficiency.

Yet another advantage is that the dense gas does not induce wetting of the membrane pores by the fluid once the fluid enters the module. Therefore, the fluid on the side of the membranes opposite that of the dense gas may be passed through the module at a higher rate without displacing the dense gas from the pores, thereby improving mass transfer efficiency.

These and other advantages and benefits will be further understood with reference to the following drawings and description:

DETAILED DESCRIPTION OF THE PREFERRED EMBODIMENTS

Figure 1:
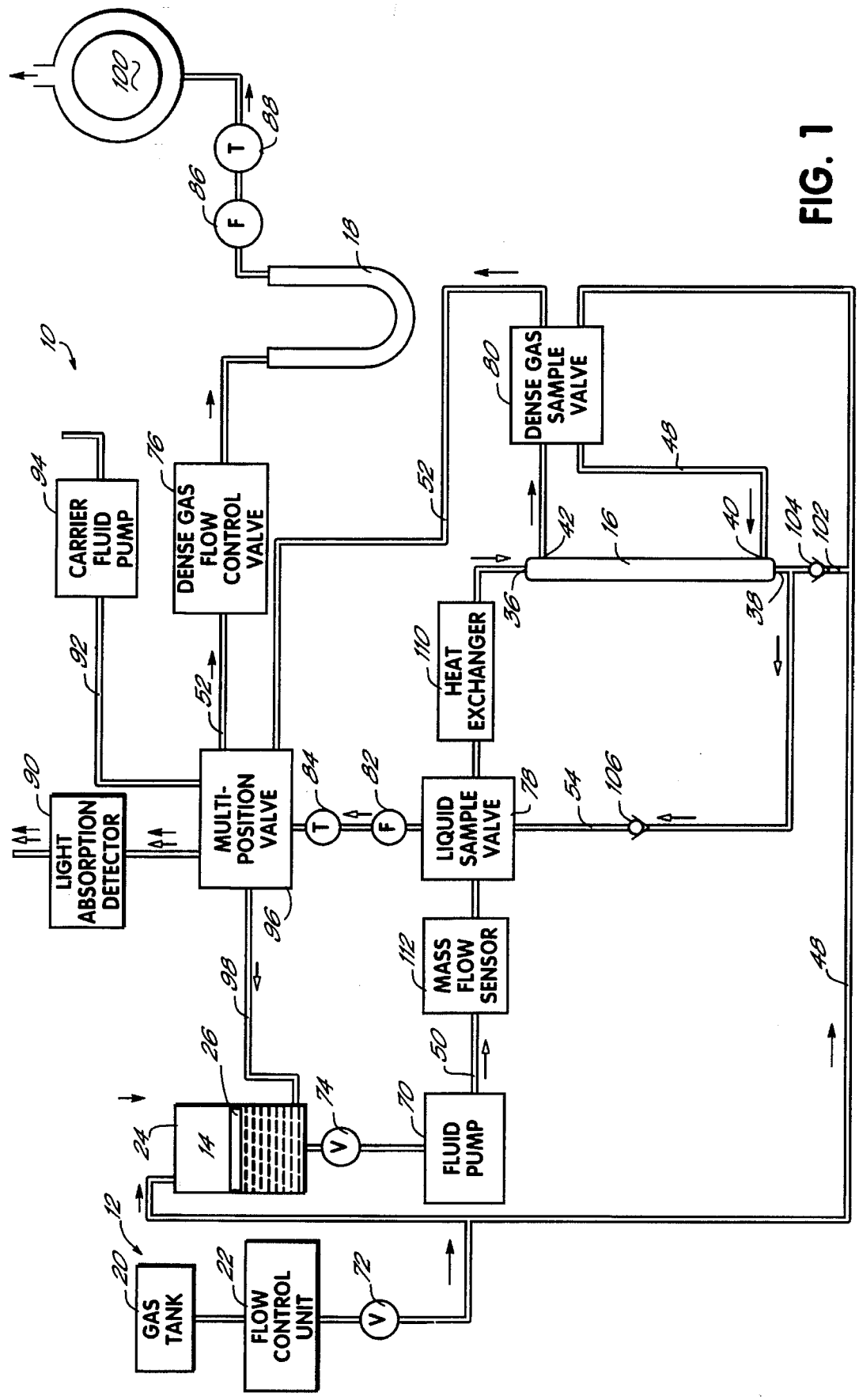
FIG. 1 is a schematic flow diagram of a preferred embodiment of the inventive system for extracting a solute from a fluid; dense gas flow is indicated by black arrows, and fluid flow is indicated by white arrows.

A system for extracting a solute from a fluid according to the principles of this invention is shown in FIG. 1. The system 10 includes a dense gas supply 12 and a fluid supply 14 for providing a dense gas and fluid to a pressurizable module 16, where extraction of a solute takes place. The system 10 also includes a U-tube separator 18 operatively connected to the pressurizable module 16, for recovering the extracted solute from the extracting medium.

The dense gas supply 12 includes a gas tank 20 and a flow control unit 22. The gas tank 20 is a standard gas tank such as a tank filled with $CO_2$ pressurized to 1000 psi. The flow control unit 22 is an integrated system of a pump with pressure, temperature and flow controls, adapted to convert the gas to a dense gas having a density of at least about 0.5 g/cc and to provide a gross flow control for the dense gas going into the remainder of the system 10.

The fluid supply 14 is housed in a pressurizable reservoir 24 having a sealable opening (not shown). The reservoir 24 may be opened to add additional fluid and/or solute. In this embodiment, the pressurizable reservoir 24 also serves as a means for substantially equalizing the pressures of the dense gas and fluid, and because the reservoir 24 is situated prior to the module 16, the dense gas and fluid will have substantially the same pressure as they pass through the module 16. The pressurizable reservoir 24 further includes a floating diaphragm 26 disposed between the fluid and the dense gas. The diaphragm 26 has a diameter approximating the inner diameter of the reservoir 24, and substantially prevents extraction of any solute within the pressurizable reservoir 24. Because the solute has solubility in both the fluid and dense gas, some extraction may occur across the boundary of the two phases within the pressurizable reservoir 24, prior to extraction within the module 16. Therefore, in order to substantially eliminate extraction from occurring within the reservoir 24, a floating diaphragm 26 is used.

Figure 2:
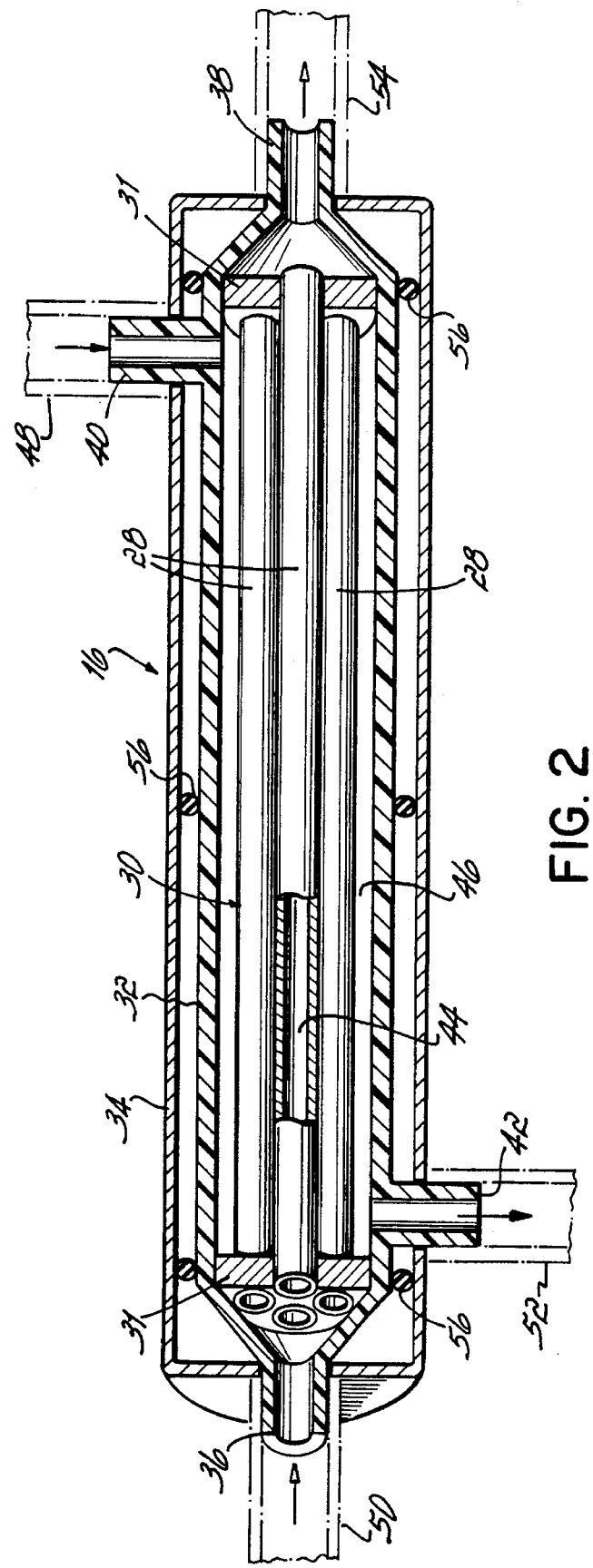
FIG. 2 is a schematic perspective view in partial cross-section of a porous hollow fiber membrane module of the system of FIG. 1.

The pressurizable module 16 is shown in greater detail in FIG. 2. The module 16, shown in a simplistic form, includes a bundle 30 of four porous hollow fiber membranes 28 running longitudinally within the module 16. However, in commercial embodiments the bundle 30 would include many membranes 28. Each hollow fiber membrane 28 terminates in a potting member 31 at opposite ends of the module 16. The bundle 30 is surrounded by a shell 32, with each potting member 31 sealed to either end of the shell 32. This shell 32 is further encased in a housing 34, using Buna N O-rings 56 to secure the shell 32 within the housing 34.

The housing 34 typically is made of stainless steel, and other metals or materials capable of operating at system pressures may be used if desired. The membrane 28, potting members 31 and shell 32 typically are made of polypropylene but may be made of any of a number of other materials such as, for example, polyethylene, polytetrafluoroethylene, polyvinylidene difluoride, nylon, polysulfonate, polycarbonate, polyester, cellulose acetate, cellulose nitrate, cellulose or acrylic.

The membrane material may be selected based upon whether a hydrophobic or hydrophilic property is desired. For example, if an aqueous fluid is passed through the module 16, then a hydrophobic membrane 28 may be desired. The hydrophobic membrane 28 will repel the aqueous fluid from the membrane pores, enabling the fluid to be passed through the module 16 at a higher rate without displacing the dense gas from the pores. Alternatively, if an oil or other hydrophobic fluid is used, then a hydrophilic membrane 28 is desired for the same reason. In both cases, mass transfer efficiency is improved.

The module 16 has a fluid inlet port 36 and a fluid outlet port 38 operatively connected to the module 16 so that the fluid passes through the module 16 on the lumen side 44 of the porous hollow fiber membranes 28. The module 16 also has a dense gas inlet port 40 and a dense gas outlet port 42 operatively connected to the shell side 46 of the membranes 28. In this way, extraction occurs across the porous hollow fiber membranes 28 along a concentration gradient, with the solute moving from the fluid on the lumen side 44 across the membranes 28 to the dense gas on the shell side 46. If desired, the dense gas supply line 48 and fluid supply line 50, as well as dense gas and fluid outflow lines 52, 54, may be connected to the module 16 so that the fluid flows through the module 16 on the shell side 46 while the dense gas flows through on the lumen side 44. If desired, the pressurizable module may be built in accordance with the construction technique and principles of Robinson U.S. Pat. No. 5,015, 585, which is incorporated herein by reference.

The U-tube separator 18 is connected to the dense gas outlet port 42 via a dense gas outflow line 52. As the dense gas charged with solute passes through the separator 18, the gas expands and the extracted solute is recovered in the separator 18. If desired, the system may be configured so that the solute is extracted from the dense gas to the fluid. In that case, a product recovery unit would be connected to the fluid outlet port 38 via the fluid outflow line 54 so that the solute could be recovered from the fluid using any of a number of known separation techniques such as distillation and the like.

The extraction system depicted in FIG. 1 includes other components as well. A fluid pump 70 is placed on the fluid supply line 50 and is used to actively pass the fluid through the pressurizable module 16. Furthermore, the pump 70 may be set at different rates, thereby allowing the user to control the rate at which fresh fluid is passed through the module 16. The system 10 includes several flow control devices for controlling the fluid and dense gas before and after passage through the module 16. The dense gas inlet valve 72 controls the entry of dense gas into the dense gas supply line 48, and the fluid inlet valve 74, located at the base of the pressurizable reservoir 24, controls the flow of fluid from the fluid supply 14. The flow of dense gas through the system 10 also is controlled by a dense gas flow control valve 76, located along the dense gas outflow line 52 between the dense gas outlet port 42 and U-tube separator 18.

The system 10 includes several monitoring devices for monitoring the flow of fluid and dense gas. A fluid sample valve 78 and dense gas sample valve 80 allow the user to selectively bypass the module 16, sending the fluid and/or dense gas through the remainder of the system 10 without extraction of solute. In order to measure the rate at which fluid and dense gas are passing through the system 10, the system 10 includes a fluid flow meter 82 and a dense gas flow meter 86. The system 10 also includes a fluid totalizer 84 and dense gas totalizer 88 for measuring the total volumes of fluid and dense gas passing through the system 10.

The extraction of solute is measured using a light absorption detector 90. The detector 90 is connected to dense gas and fluid outflow lines 52, 54 by a multiposition valve 96, allowing the user to selectively pass a dense gas or fluid sample through the detector 90. Additionally, a carrier fluid pump 94 pumps a carrier fluid through the carrier fluid line 92 and multiposition valve 96 into the detector 90, The carrier fluid may be used as needed to dilute the dense gas or fluid being measured by the detector 90, and should be a carrier fluid that has no ultraviolet absorbance and is capable of dissolving both the fluid and dense gas solvents. For example, methanol is an appropriate carrier fluid when water and dense $CO_2$ are used.

Fluid not sampled to the light absorption detector 90, moves through the multiposition valve 96 to the fluid return line 98 and flows back into the pressurizable reservoir 24. Meanwhile, the dense gas not sampled is exhausted to the atmosphere at an ambient pressure after passing through a dense gas volume expansion unit 100 connected to the dense gas outflow line 52. If desired, the system 10 may be adapted to recycle the gas from the dense gas outflow line 52 back to the flow control unit 22 for repressurization and reuse via a gas return line (not shown).

Additionally, the system 10 has a pressure maintenance line 102 connected to the dense gas supply line 48 and fluid outflow line 54. This line 102 has a one way check valve 104 and provides an additional means for maintaining pressure in the system 10. A one way check valve 106 in the fluid outflow line 54 also helps stabilize pressure. In addition, a mass flow sensor 112 and heat exchanger 110 are included along the fluid supply line 50 leading to the module 16.

In operation, a fluid containing a solute to be extracted is placed in the pressurizable reservoir 24 and the reservoir is then sealed. The hollow fiber membranes 28 are dried and the system 10 is pressurized by slowly opening the dense gas inlet valve 72, with the dense gas flow control valve 76 closed during this start up. After this pressurizing step, both the lumen side 44 and shell side 46 of the hollow fiber module 16 contain dense gas at the selected process pressure. The dense gas also fills the head space of the pressurizable reservoir 24, thereby equilibrating the pressures of the dense gas and fluid within the system 10.

Next, fluid is pumped into the module 16 by opening the fluid inlet valve 74 and selecting the desired stroke setting on the pump 70. Simultaneously, the dense gas flow control valve 76 is opened to provide the desired dense gas flow rate as shown on the dense gas flow meter 86.

At this point, the fluid is passed through the module 16 on one side of the porous hollow fiber membrane 28 and the dense gas is passed countercurrently through the module 16 on the other side of the membrane 28. Preferably, the fluid is passed on the lumen side 44 while the dense gas passes on the shell side 46. However, these may be reversed by reversing the locations of the various supply and outflow lines. Within the module 16, solute extraction is driven by a concentration gradient. Because the pressurizable reservoir 24 has substantially equalized the pressures between the dense gas and fluid, the pressure differential across the membranes 28 is minimal.

As depicted in FIG. 1, the dense gas charged with solute passes through the dense gas outlet port 42 and into the dense gas outflow line 52. The dense gas continues on through the multiposition valve 96 and dense gas flow control valve 76 to the U-tube separator 18, where the solute is recovered from the gas, and the gas is exhausted to the atmosphere. Meanwhile, the fluid stripped of solute passes through the fluid outlet port 38 into the fluid outflow line 54, and on through the fluid sample valve 78 and multiposition valve 96. The fluid then flows back to the pressurizable reservoir 24 via the fluid return line 98. The user also may measure solute extraction by passing a sample of dense gas or fluid through the light absorption detector 90. If desired, the system may be reconfigured so that the solute is extracted from the dense gas to the fluid. In that case, a product recovery unit, such as a distillation chamber or the like, is placed along the fluid outflow line 54 so that the solute may be recovered from the fluid.

Figure 3:
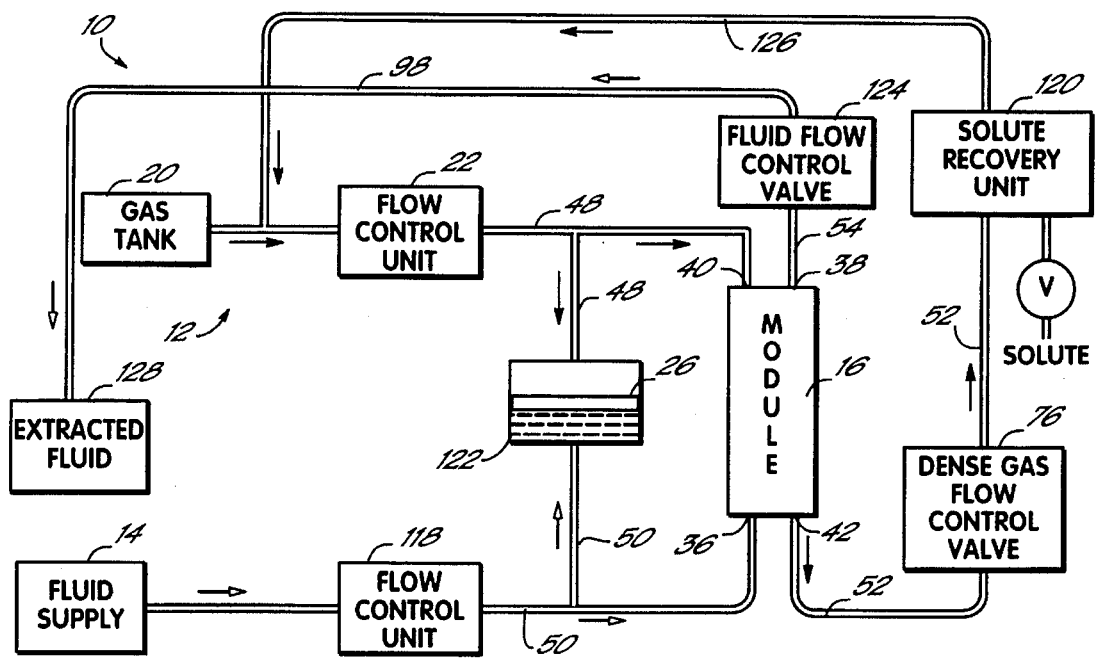
FIG. 3 is a schematic flow diagram of another preferred embodiment with black arrows indicating dense gas flow and white arrows indicating fluid flow.

Another preferred embodiment according to the principles of the invention is shown generally in FIG. 3. This embodiment is a continuous system in which the dense gas is recycled back into the system after having passed through the module. This alternative embodiment is similar in principle to the system of FIG. 1 with a few deviations. The primary difference is the addition of a gas return line 126, carrying the gas from the solute recovery unit 120 back to the gas flow control unit 22 where the gas is reconverted to a dense gas for continued use within the system. In addition, the fluid supply 14 is separated from the pressure equalization element. The fluid supply 14 has a sealable filling port (not shown) and is connected to a fluid flow control unit 118 which pressurizes the fluid. The pressurized fluid and dense gas pass from their respective flow control units 118, 22 into the fluid supply line 50 and dense gas supply line 48, where their pressures are substantially equalized by a pressure equalization chamber 122 connected to the two supply lines. The chamber 122 has a floating diaphragm 26 similar to the diaphragm of FIG. 1. Unlike the system 10 shown in FIG. 1, however, this embodiment does not have a fluid pump 70. In addition, a fluid flow control valve 124 allows the user to control the rate at which the fluid passes from the fluid outflow line 54 into the extracted fluid line 98 and into the extracted fluid collector 128. If desired, this embodiment also may include various control and monitoring devices discussed above.

EXAMPLE

Figure 4:
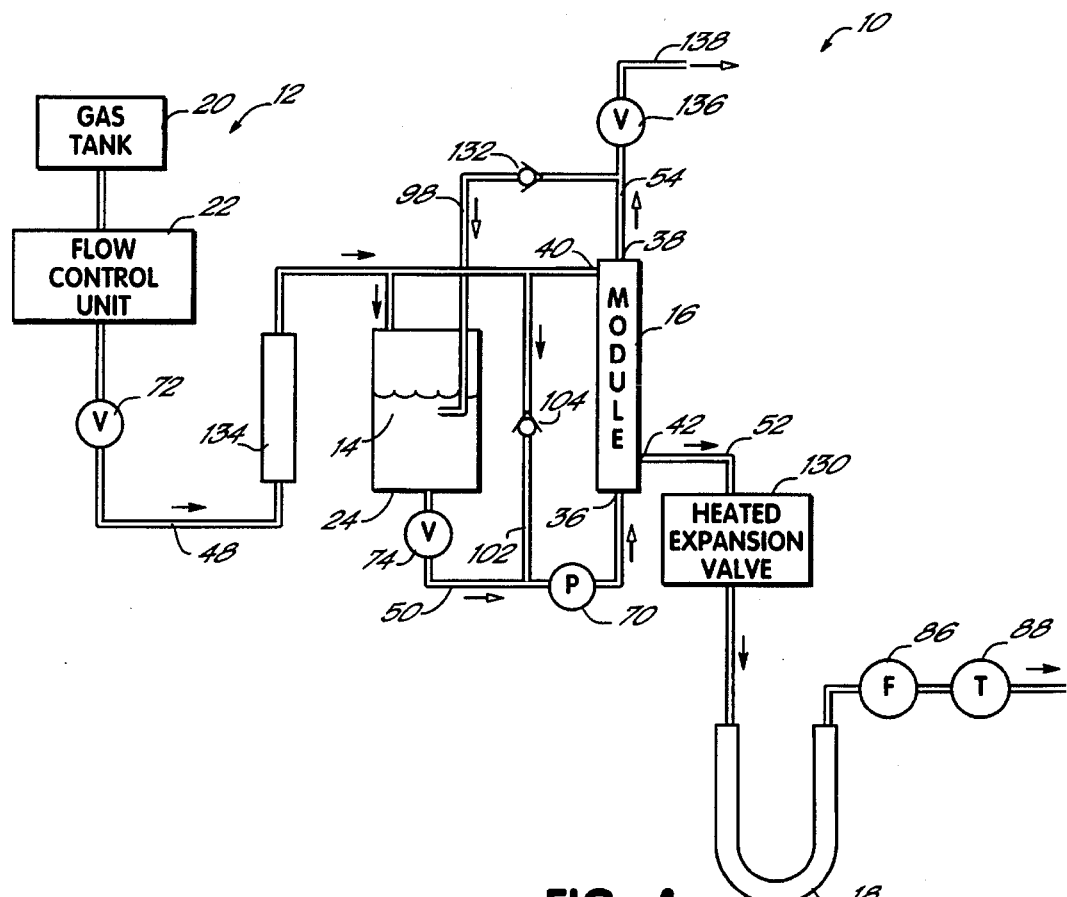
FIG. 4 is a schematic flow diagram of the system used to perform the experiments in the Example, with dense gas flow indicated by black arrows and fluid flow indicated by white arrows.

This example illustrates the extraction of caffeine from water using dense $CO_2$ as the extracting medium, according to the principles of the inventive method and system. The extraction system used for this example is shown in FIG. 4 and is a simplified version of the system illustrated in FIG. 1 discussed above.

Extractions were performed using a standard gas tank 20 containing $CO_2$ at a pressure of 1000 psi, and a 300 cc pressurizable reservoir 24. The pump 70 was an LDC brand positive displacement, variable stroke pump with a saphire plunger, having a flow rate of 7.5 cc/min at the 100% stroke setting. The material used for the reservoir 24 was No. 316 stainless steel, and the tubing connecting the various elements was 1/8" stainless steel.

The pressurizable module 16 used in this example was constructed of polypropylene and stainless steel. Polypropylene was used for the porous hollow fiber membranes 28, the shell 32 and the potting members 31. The housing surrounding the shell was made from No. 316 stainless steel 1" tubing having a wall thickness of 0.109", and the shell was secured within that housing using Buna N O-rings 56.

The polypropylene shell 32 had a length of 16" and an outside diameter of 0⅞". The module contained three porous hollow fiber membranes 28, with each membrane having a length of 16". Furthermore, each membrane had an inside diameter of 0.6 mm, an outside diameter of 1.0 mm, a pore size of 0⅔, and a porosity of 75%. The overall surface area provided by the three membranes 28 was 40 $cm^2$. The hold-up volume of the module was 0.33 ml for the liquid and 5.1 ml for the dense $CO_2$. The flow meter 86 was a rotameter, and the totalizer 88 was a conventional flow totalizer/dry test meter.

The system used in this example also included a few additional elements. The dense gas supply line 48 had a moisturizer 134 for saturating the incoming dense gas with water. The moisturizer 134 was a 100 cc cylinder filled with 3 mm glass beads and 15 cc water. The dense gas outflow line 52 included a heated expansion valve 130 which warmed the dense gas before the gas passed into the U-tube separator 18. The fluid outflow line 54 included a fluid sampling line 138 having a fluid sampling valve 136, allowing the user to draw off a sample of the fluid after it had passed through the module 16. In addition, the fluid return line 98 included a one way check valve 132.

Ten experimental runs were made using the system shown in FIG. 4. Each run was performed at a specific pressure and temperature for a set time, with a particular $CO_2$ flow and aqueous solution (caffeine in water) flow as shown in Table 1. For each run, 150 g of one weight percent caffeine in distilled water was sealed within the pressurizable reservoir 24. With the expansion valve 130 in the "off" position, the entire system was pressurized by slowly opening the dense gas inlet valve 72, After pressurizing the system, both the lumen and shell sides 44, 46 of the module 16 contained dense $CO_2$ at the experimental pressure. The dense $CO_2$ also filled the head space of the pressurizable reservoir 24, thereby substantially equalizing the pressures of the dense $CO_2$ and aqueous solution.

At time zero the fluid pump 70 was started using either the 30% or 100% stroke setting, corresponding to 2.25 or 7.5 cc/min as shown in Table 1. Simultaneously, the heated expansion valve 130 was opened to provide a selected $CO_2$ flow rate as shown on the flow meter 86. At the end of the selected extraction time period (shown in Table 1), the dense gas and fluid flows were stopped. The total amount of $CO_2$ used was indicated on the totalizer 88 as liters at one atmosphere and ambient temperature. This volume was converted to grams of $CO_2$ for presentation in Table 1.

In all the experimental runs, the temperature was ambient, and therefore the $CO_2$ was subcritical. However, at the pressures used, 1400, 3000 and 4000 psi, the $CO_2$ had a density of about 0.8, 0.9 and 0.95 g/cc, respectively. In experimental runs 8, 9 and 10, the dense $CO_2$ was saturated with 0.1–0.2% $H_2O$ as it passed through the moisturizer 134.

The material recovered in the U-tube separator 18 was a concentrated solution of caffeine in water. The separator 18 was rinsed out with acetone and combined with the acetone wash of residue in the heated expansion valve 130. After evaporation in a dish, the crystalline caffeine was weighed to the 0.1 mg, and the amount of caffeine recovered from each experimental run is shown in Table 1.

TABLE 1

| | EXPERIMENTAL DATA | | | | | | | | | |
|---|---|---|---|---|---|---|---|---|---|---|
| EXP. NO. | 1 | 2 | 3 | 4 | 5 | 6 | 7 | 8 | 9 | 10 |
| Pres. psi | 1400 | 3000 | 3000 | 1400 | 1400 | 4000 | 3000 | 3000 | 3000 | 3000 |
| Temp. °C. | 25 | 23–24 | 24 | 24–25 | 24 | 23 | 23 | 24 | 24 | 24 |
| $CO_2$ flow, g | 258 | 263 | 263 | 261 | 263 | 263 | 263 | 185* | 261* | 261* |
| Time, min | 30 | 31 | 29 | 28 | 15 | 30 | 30 | 19 | 23 | 28 |
| $H_2O$ flow, cc/min | 2.25 | 2.25 | 7.5 | 7.5 | 7.5 | 7.5 | 2.25 | 0 | 2.25 | 2.25 |
| Caf recovered from $CO_2$, mg | 53.2 | 30.0 | 24.3 | 24.5 | 14.6 | 9.1 | 21.3 | 5.7 | 24.1 | 27.3 |

*$CO_2$ saturated with 0.1–0.2% $H_2O$

What is claimed is:

1. A method of extracting a solute from a fluid or a dense gas comprising the steps of:

providing a porous membrane having opposite sides in a module under pressure with said membrane serving as a barrier interface between a fluid and a dense gas, said membrane is nonselective for said solute;

providing said dense gas into said module on one side of said membrane and said fluid on the opposite side of said membrane, where at least one of said fluid and dense gas contains a solute to be extracted, and the other one of said fluid and dense gas serves as an extracting medium, said dense gas having a density of at least about 0.5 g/cc, said fluid and dense gas being essentially immiscible in one another so as to provide two phases;

conducting said method wherein the pressure on both sides of said membrane in said module is essentially the same; and extracting said solute across said membrane as driven by a concentration gradient of said solute between said fluid and said dense gas.

2. The method of claim 1 further comprising the step of drying said membrane with said dense gas prior to said step of providing said fluid on the opposite side of said membrane.

3. The method of claim 1 wherein said dense gas and fluid are passed countercurrently on said sides of said membrane.

4. The method of claim 1 wherein said porous membrane is a hollow fiber membrane.

5. The method of claim 1 wherein said porous membrane is made of a material selected from the group consisting of polypropylene, polyethylene, polytetrafluoroethylene, polyvinylidene difluoride, nylon, polysulfonate, polycarbonate, polyester, cellulose acetate, cellulose nitrate, cellulose and acrylic.

6. The method of claim 5 wherein the diameter of the pores of said porous membrane is on the order of about 0.1μ to about 0.2μ and the thickness of said membrane is on the order of about 0.2 mm to about 0.6 mm.

7. The method of claim 1 wherein the diameter of the pores of said porous membrane is on the order of about 0.001μ to about 1μ and the thickness of said membrane is on the order of about 0.005 mm to about 3 mm.

8. The method of claim 1 wherein the pores of said porous membrane are essentially symmetrical.

9. The method of claim 1 wherein said dense gas is selected from the group consisting of methane, ethane, propane, butane, isobutane, ethene, propene, a hydrofluorocarbon, tetrafluoromethane, chlorodifluoromethane, carbon dioxide, dinitrogen monoxide, sulphur hexafluoride, ammonia, and methyl chloride.

10. The method of claim 9 wherein said hydrofluorocarbon is selected from the group consisting of partially fluorinated methanes, ethanes and propanes.

11. The method of claim 1 wherein said dense gas is carbon dioxide.

12. The method of claim 1 wherein said fluid is selected from the group consisting of fruit juice, fruit puree, vegetable juice, vegetable puree, oil-in-water emulsions, live cell fermentor broth and enzyme broth.

13. The method of claim 1 wherein said fluid is a second dense gas having a density of at least about 0.5 g/cc.

14. The method of claim 1 wherein said solute is a flavor fragrance, pharmaceutical or chelated metal.

15. The method of claim 1 wherein the method is conducted at a temperature in the range of from about −10° C. to about 200° C.

16. The method of claim 1 wherein the method is conducted at a pressure in the range of from about 2 bar to about 700 bar.

17. A method of extracting a flavor or fragrance from a fluid comprising the steps of:

providing a porous membrane having opposite sides in a module under pressure with said membrane serving as a barrier interface between a fluid and dense $CO_2$, said membrane is nonselective for said flavor or fragrance;

passing said fluid and dense $CO_2$ in opposite directions on said opposite sides of said membrane, where at least one of said fluid and dense $CO_2$ contains a flavor or fragrance to be extracted and the other one of said fluid and dense $CO_2$ serves as an extracting medium, said dense $CO_2$ having a density of at least about 0.5 g/cc, said fluid and dense $CO_2$ being essentially immiscible in one another so as to provide two phases;

conducting said method wherein the pressure on both sides of said membrane in said module is essentially the same; and extracting said flavor or fragrance across said membrane as driven by a concentration gradient of said flavor or fragrance between said fluid and said dense $CO_2$.

18. A system for extracting a solute from a fluid or a dense gas, comprising:

a dense gas supply source;

a fluid supply source;

a pressurizable module containing a porous membrane with opposite sides, said module operatively connected to said dense gas and fluid supply sources for receiving from said sources a dense gas on one side of said membrane and a fluid on the opposite side of said membrane, said membrane being nonselective for said solute, said porous membrane serving as a barrier interface between said fluid and said dense gas, at least one of said fluid and dense gas containing a solute to be extracted by a concentration gradient of said solute between said fluid and said dense gas, and the other one of said fluid and dense gas serving as an extracting medium; and means for recovering said extracted solute.

19. The system of claim 18 further including means for passing said dense gas and fluid on opposite sides of said membrane.

20. The system of claim 19 wherein said means for passing is adapted to pass said dense gas and fluid counter-currently on opposite sides of said membrane.

21. The system of claim 18 further including means for substantially equalizing the pressures of said dense gas and fluid before said dense gas and fluid enter said module.

22. The system of claim 21 wherein said means for substantially equalizing the pressures includes means for substantially preventing extraction of solute within said pressure equalizing means prior to extraction within said pressurizable module.

23. The system of claim 22 wherein said means for substantially preventing extraction within said pressure equalizing means is a floating diaphragm.

24. The system of claim 18 further including means for controlling the flow of said dense gas and fluid.

25. The system of claim 18 further including means for monitoring said dense gas and fluid, as well as the amount of solute transfer.

26. The system of claim 18 further including means for returning said dense gas and fluid to said dense gas and fluid supply sources after extraction of said solute.

27. The system of claim 18 wherein said porous membrane is a hollow fiber membrane.

28. The system of claim 18 wherein said porous membrane is made of a material selected from the group consisting of polypropylene, polyethylene, polytetrafluoroethylene, polyvinylidene difluoride, nylon, polysulfonate, polycarbonate, polyester, cellulose acetate, cellulose nitrate, cellulose and acrylic, and the diameter of the pores of said porous membrane is on the order of about $0.001\mu$ to about $1\mu$ and the thickness of said membrane is on the order of about 0.005 mm to about 3 mm.

29. The system of claim 28 wherein said diameter of the pores of the porous membrane is on the order of about $0.1\mu$ to about $0.2\mu$ and said thickness of the membrane is on the order of about 0.2 mm to about 0.6 min.

30. The system of claim 18 wherein the pores of said porous membrane are essentially symmetrical.

31. The system of claim 18 wherein said dense gas is selected from the group consisting of methane, ethane, propane, butane, isobutane, ethene, propene, a hydrofluorocarbon, tetrafluoromethane, chlorodifluoromethane, carbon dioxide, dinitrogen monoxide, sulphur hexafluoride, ammonia, and methyl chloride.

32. The system of claim 31 wherein said hydrofluorocarbon is selected from the group consisting of partially fluorinated methanes, ethanes and propanes.

33. The system of claim 18 wherein said dense gas is carbon dioxide.

* * * * *

UNITED STATES PATENT AND TRADEMARK OFFICE
CERTIFICATE OF CORRECTION

PATENT NO. : 5,490,884
DATED : February 13, 1996
INVENTOR(S) : James R. Robinson and Marc J. Sims It is certified that error appears in the above-indentified patent and that said Letters Patent is hereby corrected as shown below:

Column 8, line 28, "0 2/7"    should be --0.2 $\mu$--

Column 12, line 28, Claim 29, "0.6 min"    should be --0.6 mm--

Signed and Sealed this

Tenth Day of September, 1996

Attest:

BRUCE LEHMAN

Attesting Officer    Commissioner of Patents and Trademarks